No. 870,715.  
PATENTED NOV. 12, 1907.  
E. P. COWLES.  
VARIABLE SPEED GEARING.  
APPLICATION FILED DEC. 31, 1902.  
3 SHEETS—SHEET 1.
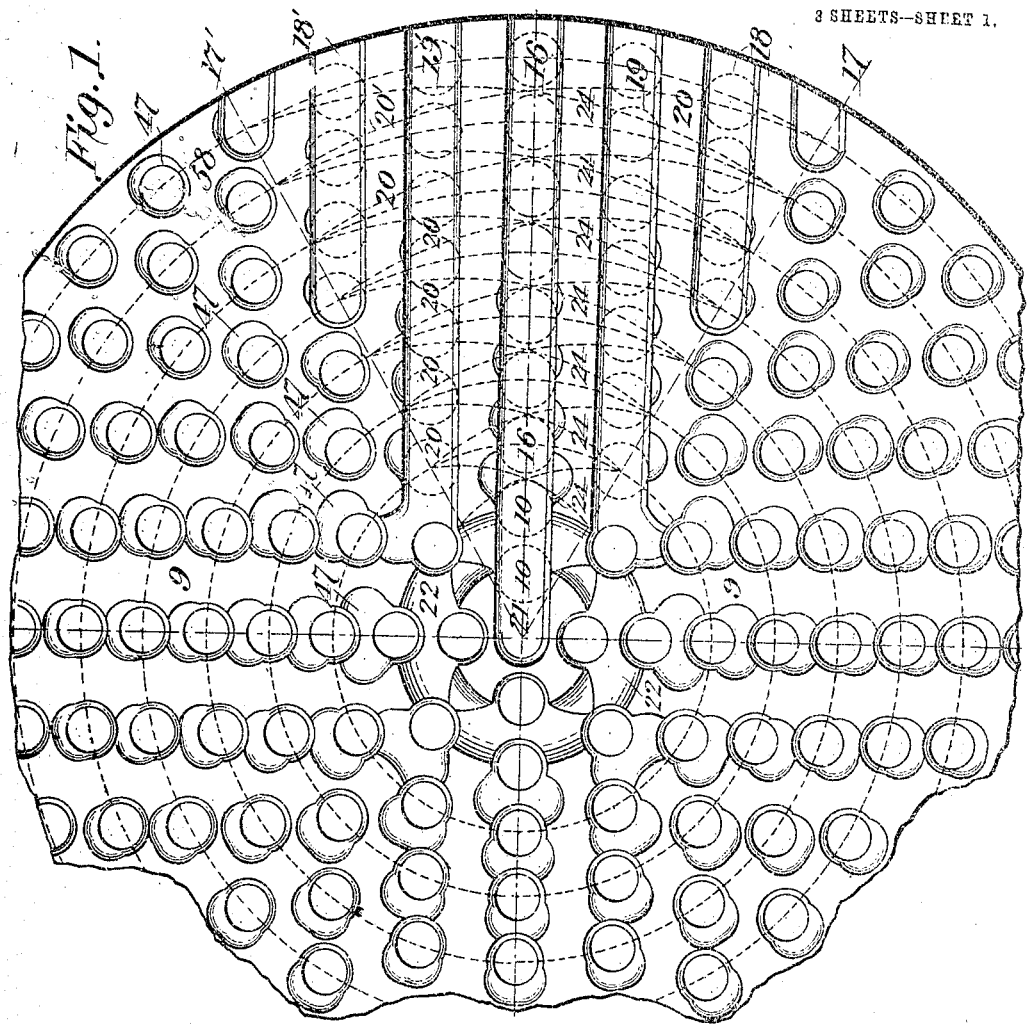
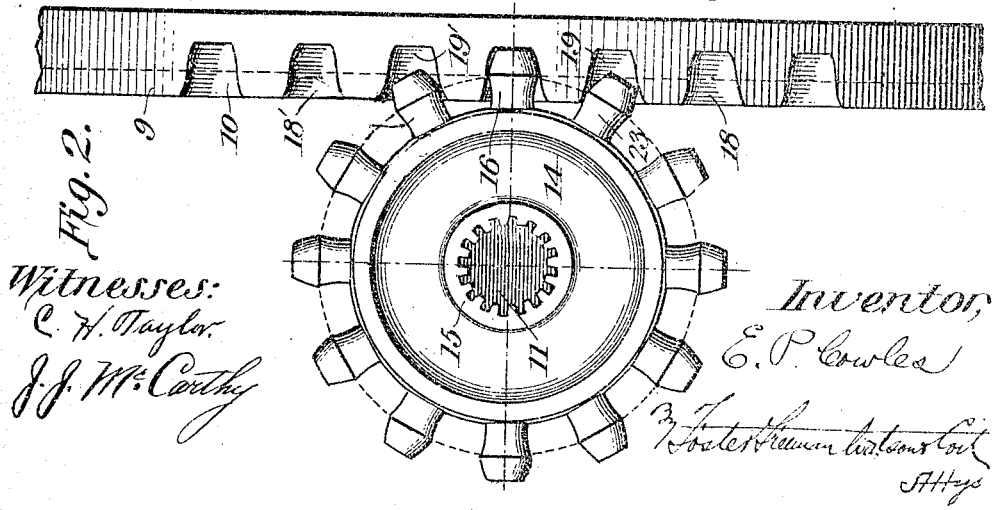
Witnesses:  
C. H. Taylor.  
J. J. McCarthy.
Inventor,  
E. P. Cowles

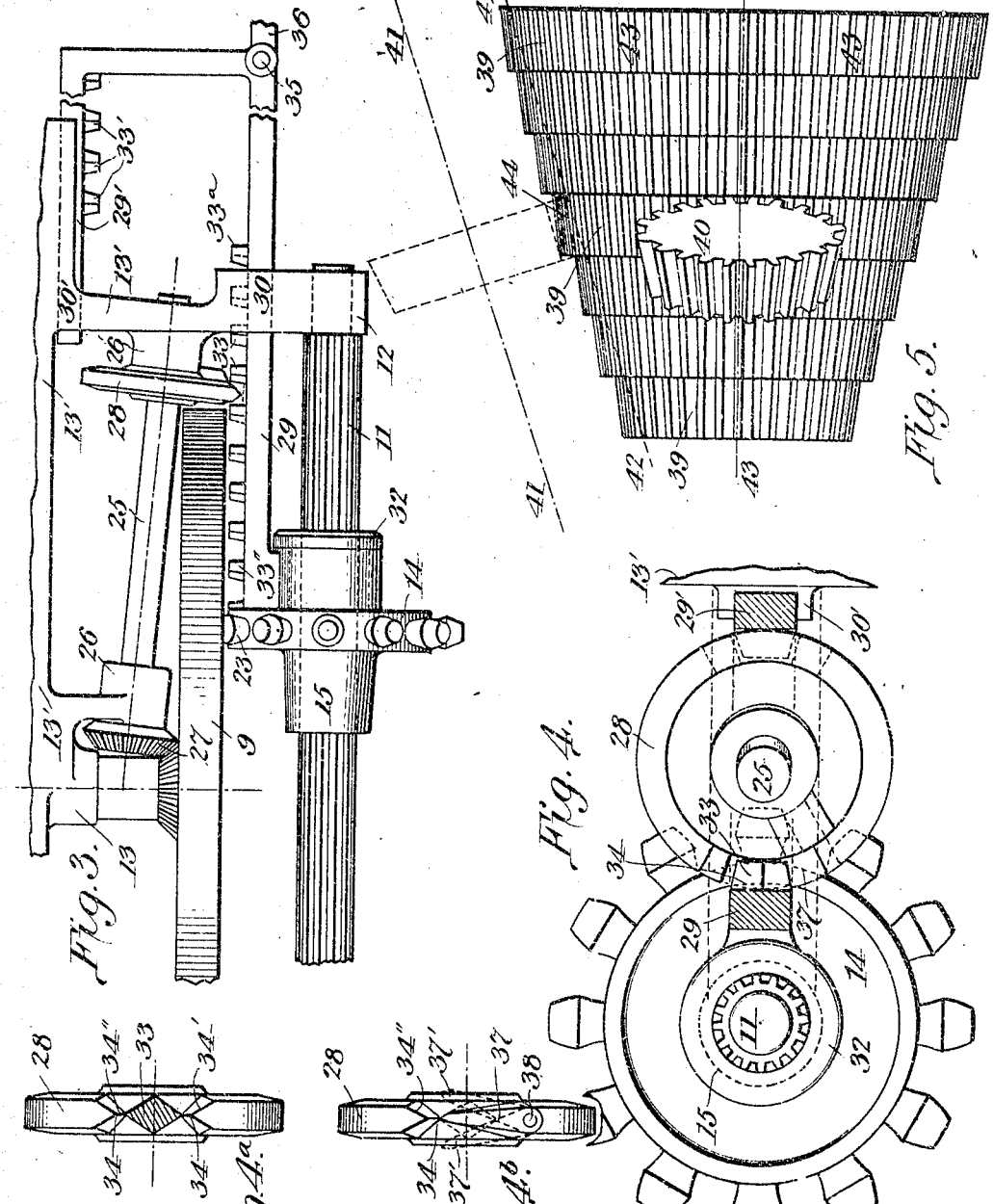

No. 870,715.
PATENTED NOV. 12, 1907.
E. P. COWLES.
VARIABLE SPEED GEARING.
APPLICATION FILED DEC. 31, 1902.
3 SHEETS—SHEET 3.
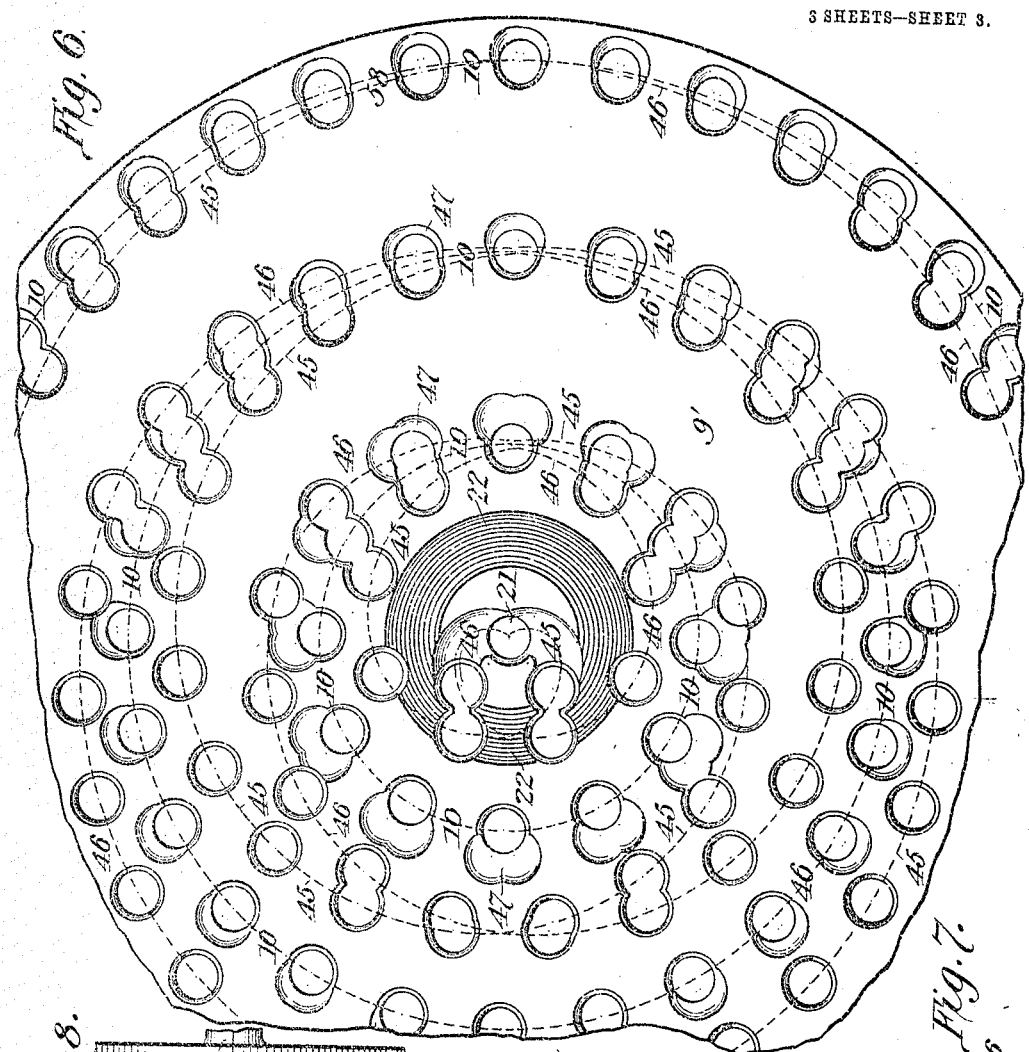
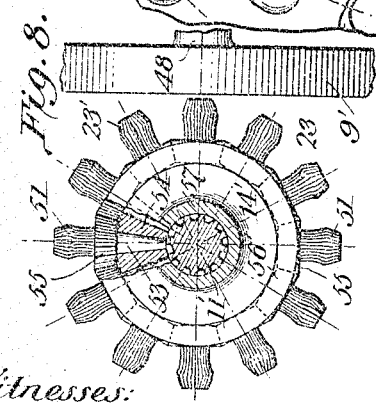
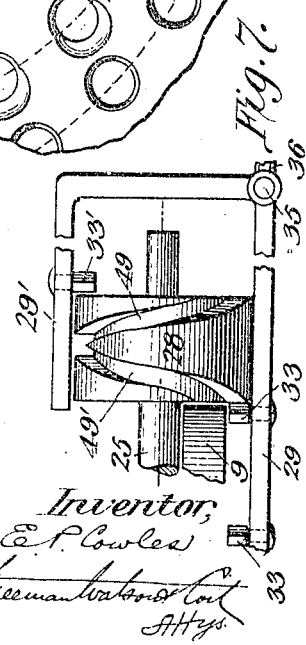
Witnesses:
C. H. Taylor
J. J. McCarthy
Inventor,
E. P. Cowles
By Foster Freeman Watson & Coit
Attys.

UNITED STATES PATENT OFFICE.

EDWARD P. COWLES, OF WARREN, OHIO.

VARIABLE-SPEED GEARING.

No. 870,715.  Specification of Letters Patent.  Patented Nov. 12, 1907.

Application filed December 31, 1902. Serial No. 137,369.

*To all whom it may concern:*

Be it known that I, EDWARD P. COWLES, a citizen of the United States, residing at Warren, in the county of Trumbull, State of Ohio, have invented certain new and useful Improvements in Variable-Speed Gearing, of which the following is a specification.

My invention relates to variable speed transmission gears, particularly to a special form of gear, consisting of a pinion engaging a disk provided with concentric circular rows of pockets or indentations adapted to receive the pinion teeth, and means connecting the different rows of said pockets, so that the pinion can be moved from one row to another without disengaging the disk, and is especially adapted to motor vehicles operated by non-reversing motors.

It has for its object, to produce a gear whereby the motion of the vehicle, or machine, can be varied, stopped or reversed, without disengaging the gears, or disconnecting any part.
It consists first: in providing the disk gear or series of gears, with a segment having pockets shaped to allow the pinion to be moved from one row to another, to change the speed without disengaging, and giving an appreciable time to make such change. Second in extending this segment to the center of the disk whereby the pinion can be traversed to the center, with one tooth in the center pocket, around which the disk can turn while the pinion remains stationary. Third, means whereby the pinion can be traversed past the center to the opposite side of the disk, to reverse the motion. Fourth, in means for positively, and automatically, traversing the pinion from center to circumference of the disk, or vice versa, on either side, and maintaining the pinion in engagement with a row of pockets with precision.

The invention consists further in arrangement of parts, and specific devices for effecting the various movements, and shaping the pockets, all of which will be fully described in the following specification, reference being had to the accompanying drawings, in which Figure 1 is a side view of the disk. Fig. 2 is an end view with pinion. Fig. 3 is a top view showing means for traversing the pinion. Fig. 4 is a portion of end view showing the traversing cam disk and rack. Figs. 4ᵃ, & 4ᵇ are details of traversing cam. Fig. 5 shows my principle applied to a pinion and cone, consisting of a series of spur gears. Fig. 6 is a side view of a disk gear with the traversing segment extending entirely around the disk. Fig. 7 is a top view of the traversing cam adapted to a disk like Fig 6. Fig. 7ᵃ is a detail of Fig. 7. Fig. 8 shows a device for shaping the pockets in disk. Fig. 8ᵃ is a detail of Fig. 8.

Referring to the drawings, 9 indicates a disk, which can be the balance wheel of the motor. There are formed in the face of this disk a series of circular rows of pockets 10, 10, arranged concentric with each other and with the disk 9, said pockets being spaced equal distances apart, and all having a common pitch. A shaft 11, Figs. 2 and 3 is arranged parallel with the face of the disk 9, its axis cutting the axis of the disk. This shaft is mounted in suitable bearings 12, which are permanently connected with the bearing 13 of disk 9. Said shaft is provided with a pinion 14, having teeth adapted to engage with the rows of pockets 10 in disk 9. In the embodiment of the invention illustrated in Figs. 1 to 4 these teeth are round, having a section in the rotating plane, conforming to the shape of pinion teeth, as shown in Figs. 2 and 3. The hub 15 of said pinion 14 is connected to the shaft 11 by a slot and feather, or, preferably, shaft 11 is grooved like pinion wire, and the hub 15 is provided with a series of internal teeth extending throughout its length, which teeth fit in the grooves of shaft 11, adapting the hub and pinion to slide freely on shaft 11, while being rotatively rigid with it. It is obvious that as the pockets in the circular rows 10, 10 are all of the same pitch, pinion 14 will work smoothly in any of them.

It will be seen that instead of pockets or perforations sunk in the face or surface of the disk the circular rows can be in the form of teeth, formed by raising that portion 58, Figs. 1 and 6, between the pockets from the plain surface, in which case they would appear like the edge of disk 9 in Fig. 2. In the drawings pockets or indentations are shown and the term "pockets" used to make the description perfectly clear, but it will be understood that teeth, of the usual or any desired form, can be used.

The pockets in rows 10, 10 are arranged to start from a common radial line as at 16, Fig. 1. That is one pocket of each concentric series of rows is arranged in the same radial line, or each of said series can be considered as starting from said line.

In addition to the pockets arranged, as aforesaid, in the concentric rows, 10, there are provided other, similar pockets which are arranged to intersect and communicate with the teeth or pockets in the concentric rows 10 and to form spiral paths through which the pinion may be moved from one circular row of pockets to another corresponding row.

It will be seen that the pockets adjacent to line 16 on either side will form practically straight rows, parallel with line 16, growing shorter and increasing in number near the periphery of the disk, forming or occupying a segment of the disk. This segment can include any desired portion or extent of disk 9. In Fig. 1 of the drawing it covers one sixth of the face of the disk being included between the broken lines 17, 17′. The said straight parallel rows may be joined by slots 16′, 18, 18′, 19, 19′.

It will be seen that each of the aforesaid spiral lines intersects at its ends pockets in two of the concentric rows, and connects such concentric rows. The said intersections of the spiral lines and concentric rows form, as aforesaid, a series of parallel rows.

It is obvious that if pinion 14 is caused to commence traversing from—for instance—the outside circular row to the next inside, when line 17 is opposite its center, it can occupy the time it takes the segment to pass this center in making the movement, following the broken spiral line 20′, giving pinion 14 an appreciable length of time to do so. During the next revolution the pinion can be moved from the second concentric row of pockets 10, to the third or next succeeding row toward the axis of the disk, and so on until it reaches the center, following the broken spiral lines 20 similar to 20′, as shown. When the pinion reaches the center of disk 9, one tooth thereof is engaged in the central pocket 21, the pinion being held stationary, while the disk 9 revolves around said central tooth as a bearing. A circular recess 22 is formed around the central pocket 21, in which the two teeth of pinion 14, (23, 23′ Fig. 2.) adjacent to the tooth engaged in the central pocket 21 are free to pass as disk 9 revolves. Pinion 14 can be traversed from center to circumference in the same way, following in such outward movement the broken spiral lines 24 instead of 20.

It is obvious that when pinion 14 is at the center of disk 9, if the movement of the pinion 14 is continued to the left, and is commenced when the traversing segment included between lines 17, 17′ is on the opposite side of the disk, it will traverse the left side from that it occupied when the pinion was moving from the periphery to the center of the disk the same as has been described for the right side, and that it will revolve in an opposite direction or, its motion will be reversed.

It will be understood that if the pinion 14, after being traversed or adjusted from one row of pockets in the disk 9 to another, across the traversing segment, is retained in this position, it will be engaged and driven continuously by the then engaging row of pockets, until it is moved again, and the speed of the pinion will be decreased or increased according as it is moved or traversed to, or from the center of the disk 9.

The concentric rows of pockets 10 increase in diameter from the center by a common increment, and therefore the number of pockets in each have a common multiple. There can be as many different traversing segments on the disk as there are units in this multiple. In the present instance this multiple is 4, and it will be seen from Fig. 1 of the drawing that there can be four traversing segments, the pockets arranging themselves in practically parallel rows at four points, at right angles to each other, and, therefore, the pockets at any of these points could be shaped to form traversing segments and pinion 14 be moved four times during each revolution of disk 9. However I prefer to employ one segment as shown.

In Figs. 3 and 4 I show a means for positively and automatically traversing pinion 14 from one row of pockets in the disk 9 to another. Adjacent the opposite face or side of disk 9 from that engaged by pinion 14 is mounted a shaft 25, having bearings 26, 26′ in the frame 13′ of the motor. The axis of this shaft is practically parallel with that of shaft 11 and its inner end is connected by miter gears 27 to the shaft of disk 9, so that it revolves accurately with the same speed as the disk. On the outer end of shaft 25 is secured a cam disk 28, having a diameter which will cause its periphery to project slightly beyond the face of the disk 9, with which the pinion 14 engages. A bar 29, arranged parallel to shaft 11 and movable longitudinally in suitable ways 30, 30′ on the motor frame, has on its inner end a sleeve 31, which engages the hub of pinion 14, being secured thereon by a collar 32. The hub of pinion 14 turns freely in this sleeve, but may be forced along shaft 11 by it. Bar 29 is provided with rack-like teeth 33, spaced accurately the same distance apart as the circular rows of pockets 10 in disk 9. The edge of cam disk 28, projecting beyond front face of disk 9, passes between the teeth on bar 29, and when so engaged, pinion 14 will be in position to engage one of the concentric rows of pockets 10, in disk 9. Cam disk 28, has a gap 34 cut in its periphery to allow the teeth 33 on bar 29 to pass through either way, the edges of this gap and the edges of teeth 33 have a knife edge, so that they cannot abut, as shown in Fig. 4$^a$. This gap is placed so that the teeth 33 on bar 29 can commence to pass through it the instant that line 17 on disk 9 comes opposite the center of pinion 14, and is of such a length as to allow the teeth 33 to occupy a period of time in such passing corresponding to the dimensions or proportions of the traversing segment. In the form illustrated in Fig. 1 this time is one sixth of that required for a revolution of cam disk 28 and disk 9. Pivoted to bar 29, at 35, is a rod 36, extending to a lever (not shown) convenient for the operator to handle, by means of which rod 29 and pinion 14 can be moved along shaft 11, and across the face of disk 9.

In operation, assuming that pinion 14 is engaged with the outside concentric row of pockets 10 in the disk 9, and cam disk 28 is engaged between the first two teeth 33″, on bar 29, the operator by means of lever (not shown) and rod 36, connected to said lever and bar 29, presses bar 29 to the left. This causes tooth 33″, to bear against the outside of cam disk 28, and when the gap 34 in this disk comes into register with this tooth, it follows the lower outside beveled edge 34, (Fig. 4$^a$) until the upper edge 34″ engages the upper edge of tooth 33″ when the tooth and bar 29 are forced toward the axis of disk 9 until cam disk 28 is engaged between the second and third teeth on said bar, and the pinion 14 is engaged in the second circular row of pockets on disk 9, having traversed across the traversing segment on disk 9, following the broken spiral 20′, and will be held in engagement with this row until moved again. If the pressure on bar 29 is continued to the left, pinion 14 will be moved from the second row of pockets to the third, and so on, one step at each revolution of disk 9, until the pinion reaches the center of the disk. It is obvious that the pinion 14 can be traversed from center to circumference of disk 9 in the same manner as has been described for traversing in the opposite direction, by pressing bar 29 to the right. The number of teeth 33 on bar 29 are sufficient only to provide for traversing the right side of disk 9, and when pinion 14 is at the center of disk 9, the last tooth 33$^a$ will bear on the inner side of cam disk 28. The outer end of bar 29 has a return bend which brings the end 29′ on the opposite side of cam disk 28 from bar 29, said end 29′ sliding in a way 30′, in frame 13′. It is provided with rack teeth 33′ similar to those on bar 29. These teeth are so placed with respect to those on bar 29, that when pinion 14 occupies the central position with one of its teeth engaged in the central pocket 21 in disk 9, the last tooth 33ᵃ on bar 29 will bear on the inner side of cam disk 28, and the first tooth 33′ on the bar 29′ will bear on the outside of said cam disk, thus maintaining pinion 14 in its central position. If while the parts are in this position pressure is exerted to move bar 29 to the left, the first tooth 33′ on bar 29′ will be pressed against the outside of cam disk 28 until the gap 34 therein comes into register with this tooth, which will be half a revolution later than its registering with the teeth 33 on bar 29, and consequently the traversing segment between broken lines 17, 17′ on disk 9, will be at the left of the center of disk 9, and teeth 33′ on bar 29 will commence to pass through gap 34, when line 17 is opposite the center of pinion 14 on the left side of disk 9. As hereinbefore explained under these conditions pinion 14 can be traversed from center to circumference or vice versa on the left side of disk 9, the same as has been explained for the right side, and it is obvious that on this side pinion 14 will revolve in an opposite, or reverse direction from what it would when acting on the right side of said disk.

If too great pressure were applied to bar 29 when the teeth on bars 29 & 29′ were passing through gap 34, it might move too far and cause trouble. To obviate this, I provide the lower edge of gap 34 in cam plate, 28, with an adjustable lip 37, Figs. 4 & 4ᵃ, capable of a limited movement about the pivot 38. It extends up to nearly touch the opposite edge 34″, when it comes opposite a tooth on bars 29, 29′, under pressure, it is pressed over into the positions shown by broken lines 37′, and the tooth follows up the slanting side but is not disengaged until the upper edge 34″ of gap 34 engages the next tooth, which makes it impossible to move the pinion 14 but one step in a revolution of disk 9.

In Fig. 5 I have shown my invention applied to a series of spur gears 39, arranged in the form of a step cone. Like the circular rows of pockets 10 in Fig. 1 they vary in diameter by a common increment and have teeth all of the same pitch. A pinion 40 is arranged to slide along a shaft similar to shaft 11 in Fig. 3, and is provided with means to slide it along this shaft from one gear to another, similar to the device shown in connection with Fig. 3, except that the cam gear can be a flange projecting from one of the outside gears, and as this form does not stop, or reverse, the return bend in bar 29 can be omitted. The pinion shaft is arranged with its axis 41 parallel with the average cone line 42 of gears 39. Both the pinion and gears are slightly beveled to conform to the relative angle of the two axes. Gear wheels 39 are arranged with one tooth in each in a plane containing the axis at 43. The adjacent teeth on either side of this line will be in practically parallel lines forming a segment broadening towards the large end of cone 39 between 43, 43, as has been explained in connection with Fig. 1. The teeth in this segment and all of the pinion teeth are cut deeper on one side, so that their bottoms are parallel with the axis of pinion 40, as shown by broken lines at 44, and the faces of pinion teeth and adjacent faces of teeth in the segment are cut nearly parallel, so that while pinion 40 is passing through this segment it can be traversed from one gear to another either way, in the manner explained in connection with Fig. 3. When it is desired to use a less number of gears, but to retain the range of speeds, one or more of the steps between the wheels it is desired to use, can be left out, retaining the portion of the segment lying between them. If the space between the wheels used is considerable (that is, if more than one wheel is left out) the portion of the traversing segment between the wheels, will be in the form of a conical helix, extending one or more times around, and leading from one wheel to another, substantially the same as will hereinafter be described in connection with Fig. 6. It will be observed that if the center of disk in Figs. 1 and 6 were drawn forward towards the observer it would develop the cone gear in Fig. 5, the circular rows of teeth would be changed to gear wheels 39, and the spirals 45 and 46 in Fig. 6 to a conical helix, as referred to above. This form is adapted to motors that can be conveniently reversed and stopped like steam, in which case the pinion may be the driver, and the cone gears the driven; the same can be done with the disk form, as it would not be necessary for the pinion to traverse to the center or across.

In Fig. 6 I have shown a slightly changed form of disk gear from that shown in Fig. 1, it being adapted for use where it is desired to use a less number of pockets but to retain the range of speeds. In the disk illustrated in Fig. 6 there are only three circular rows of pockets 10, giving three changes of speed, the two circular rows of pockets shown in Fig. 1 between each of these illustrated in Fig. 6 being omitted. In this case the increased space between the circular rows of pockets, 10, 10 requires that the traversing segment be much extended, to give the pinion time to traverse from one row to another. In the present instance it is practically extended entirely around the disk. It however, could extend one half, or one third way around. Owing to the distance between the circular rows of pockets 10, 10 the spiral and concentric rows of pockets do not cut into each other, and the slots 16′, 18, 18′, 19, 19′ disappear. The pinion in traversing from one row to another, and starting on radial line 16, follows the spiral line 45 toward the center and the spiral line 46, 46 from the center. In the present instance these spirals pass entirely around the disk, from one circular row to another, the pinion entering the next succeeding concentric row at a point in a line 16 including the point from which it started in the preceding concentric row and together they form two continuous spirals, one, 45 leading from the circumference to the central pocket 21, and the other, 46, leading from the central pocket 21, to the circumference. And if desired, pinion 14 could traverse continuously across the face of disk 9 in either direction. The spirals can however go one or more times and a fraction, between the circular rows of pockets 10, 10.

Cam disk 28 is modified to adapt it to the increased distance between circular rows of pockets 10, by making it thicker and cutting right and left hand threads or slots 49, 49′ in its periphery of a pitch equal to the distance between circular rows of pockets 10, 10. Teeth 33 are pivoted to bar 29 and have a limited oscillatory movement shown in broken lines 50 in Fig. 7ᵃ. When the bar 29 is pressed to the left, one of these teeth bears against the outside of cam disk 28 until the opening of slot 49 registers with it, when it turns, as shown at 50 Fig. 7ª, and follows this slot, forcing pinion 14 to follow along the spiral line 45. When the bar is pressed to the right one of the teeth 33 bears against the inner side of cam disk 28 until slot 49′ registers with it, when it turns as shown at 50′ and follows this slot forcing pinion 14 to follow along the spiral line 46. Return bend 29′ has the same function in this case as that, described in connection with Fig. 3. By simply moving bar 29 one way or the other until pinion teeth have followed the spiral line beyond the point where they cut into circular rows of pockets 10, 10 pinion 14 would be moved along its shaft by its teeth engaging the pockets in the spiral lines, without cam disks 28, but I prefer the more positive method described.

The pockets 10, 10 have to be cut away slightly on the edges to accommodate the teeth of pinion 14, entering in a circle at right angles to face of disk 9 and have to be cut away more on those near the center as shown at 47, 47. To make the drawing more clear I have shown slots 16′, 18, 18′, 19, 19′ in Fig. 1, straight, with smooth sides. However in practice they would not be so, the pockets would run into each other, leaving the sides with a twisted, corrugated surface. It would be difficult or impossible to shape these teeth or pockets mathematically. It may be done mechanically by the means shown in Fig. 8 referring to which 9′ indicates a blank disk of some soft material, such as wood or soft metal, which is mounted on a shaft 48, provided with means to either revolve it continuously or for oscillating it back and forth to a limited extent. Pinion 14′ and its shaft 11′ are similar to that described in connection with Fig. 3, the pinion having a hub adapted to slide on shaft 11′ across the face of disk 9′; but in respect to rotation rigid with it. The bearings of shaft 11′ have means for moving the shaft and pinion toward and from the disk 9′. The teeth 51 of pinion 14′ are shaped accurately like those of pinion 14, but are provided with cutting edges like milling cutters, as shown at 52, Fig. 8ª, and each is mounted on a spindle 53, turning in bearings in the solid part 54 of the pinion, so that they revolve on an axis radial with the pinion. Each spindle 53′ is provided with a bevel wheel 56, pinion 55 which engages with a bevel secured to a sleeve 57, which turns freely on shaft 11′. The outer end of this sleeve is provided with means to revolve it and the pinion teeth, constantly, and at the same time allow the sleeve to slide along shaft 11′ as for instance, a flanged pulley, belted to a drum. Shaft 11′ is connected to a shaft 48 of disk 9′ by change gears, substantially the me as the change gears between the leading screw and head of screw cutting engine lathe, so that by changing the gears, pinion 14′ can be made to revolve at any speed relative to disk 9′. Pinion 14′ is provided with means to traverse it from one row of circular pockets to be cut in disk 9, to another, similar to that described in connection with Fig. 3. In operation pinion 14′ is placed, for instance, in proper relation to the disk 9′ to cut therein pockets corresponding to the outer row in disk 9, and a gear placed in the train connecting shaft 11′ with shaft 48 that will give the pinion the exact speed relative to disk 9′ that it would have when driven by engagement therewith. Pinion 14′ is then fed up slowly to disk 9′, as it revolves, until a circular row of pockets is cut to the proper depth. Pinion 14′ is then moved opposite the next circular row, a suitable gear placed in the train, and the operation repeated, and so on, until the center is reached. In cutting the central pocket 70 pinion 14′ is held stationary, with the axis of one tooth in line with the axis of disk 9′. As it is fed toward the disk this tooth cuts the central pocket 21, and the two adjacent teeth 23², 23³ cut the circular recess 22. The traversing movement is then applied to pinion 14′, and the disk 9′ oscillated back and forth one sixth of a revolution, with the traversing segment, between lines 17 & 17′, opposite the pinion and the proper gear in the train. As the disk oscillates, pinion 14′ will traverse back and forth from one circular row to another and as it is fed to disk 9′ will cut the spiral rows 20—24, across the traversing segment. The disk shown in Fig. 6 would have its pockets cut in the same way except in the last operation the disk would oscillate back and forth one revolution. It is obvious that by this means the pockets would be shaped perfectly to run smooth and true. The disk after being cut can be used as a pattern to cast from, and the same means can be used to finish the casting.

The pockets can be of different form from these shown, in any case a section in the plane of revolution should develop the curves of pinion teeth adapted to work in a rack, and a section laterally, the curves of a rack tooth.

For shaping pockets adapted to pinion teeth of a different shape from those shown, (that is, not round), I would make the blank disk 9′ of a suitable kind of wax, and employ a metal pinion 14′ having teeth of the shape desired and kept at a temperature sufficient to melt away the wax.

Shaft 11 can be connected to the driving axle of a motor vehicle by any suitable means. Preferably I would place the shaft at such an inclination from the horizontal that a prolongation of its axis would cut the axis of the driving axle, and connect it to the driving axle by a flexibly connected shaft and bevel gears. But pinion 14 can have separate bearings, sliding on permanent ways on a line with shaft 11, and be connected to driving axle by an extensible shaft sufficiently stiff to resist the turning effort of driving the wheels, with flexible connection inside of pinion hub only, substantially as described in connection with my variable speed friction transmission application Serial No. 126390.

It will be observed that pinion 14 is never disengaged from disk 9 or the motor, and there are no intermediate clutches, or disconnecting devices of any sort, between propelling wheels and motor. For this reason no brake is required. The pinion 14 traversing towards center of disk 9 effectually checks and controls the speed of the vehicle. All the functions of regulating the speed, braking, stopping, reversing, etc., are performed without coupling or uncoupling any part, or disconnecting the motor from the propelling wheels in any way.

In going down inclines, checking the speed, etc. the momentum of the vehicle is thrown on the motor, power being transmitted from the running gear to the motor. The friction of the motor has such a great leverage on this power when transmitted in this direction, that it is practically neutralized, but when pinion 14 is near the periphery it might increase the speed of the motor beyond a safe limit. To obviate this I would use an automatic balance wheel brake, substantially as shown in my application, explosive engines, Serial No. 118002.

It will be evident that many changes in the details of construction, and arrangement of the apparatus herein before described can be made without departing from the spirit and scope of my invention. Thus for instance, the desk can be provided with other form of gear engaging means from those shown. Many equivalent devices may be submitted for shifting the pinion from one gear to another, and other means for mounting the pinion to move parallel with face of disk on a diametrical line, may be introduced in place of those shown. I intend in the broader claims of this specification, to cover all such equivalent devices, and in the more specific claims to cover the particular devices illustrated and described, and which at the present time seem to be the best embodiment of my invention.

It will be observed that the pinion 14 in following the spiral paths 20—24 and 45—46 from one circular row to another, has its rotary motion accelerated or retarded to synchronize with the circular row it is about to enter, so that in changing there is no shock or jar. Pinion 14 running out of one row, along the spiral path, into another row as smoothly, and positively, as when engaged in one of the circular rows.

Having thus described the invention, what is claimed as new, and desired to be secured by Letters Patent is:

1. In a variable speed gearing, the combination of a gear having a plurality of series of engaging surfaces all of the same pitch and arranged at different distances from the axis of the gear, a pinion meshing with said gear, power devices for connecting said gear and pinion with a motor and with an element to be driven, and means actuated by the gear for shifting the pinion into engagement with either series of said surfaces on the gear while engaged therewith and while the motor and connecting devices are in operation.

2. In a variable speed gearing, the combination of a gear having a plurality of series of engaging surfaces all of the same pitch and arranged at different distances from the axis of the gear, each series starting from a common line lying in a plane including the axis of the gear, and forming a segment of parallel rows adjacent said line, a pinion meshing with said gear, power devices for connecting said gear and pinion with a motor and with an element to be driven, and means for shifting the pinion into engagement with either series of engaging surfaces on the gear while passing said segment of parallel rows without disengaging it from the gear and while the motor and connecting devices are in operation.

3. In a variable speed gearing, the combination of a rotatable disk having in one face a plurality of series of pockets arranged in concentric rows and means connecting all of said concentric rows on the same radii, whereby a pinion continuously engaging said disk may be moved from one of said rows to another, a pinion engaging said pockets in the disk, power devices for connecting said disk and pinion with a motor and with an element to be driven, and means for adjusting said pinion from one of said concentric rows of pockets in the disk to another to vary the speed of the driven element.

4. In a variable speed gearing, the combination of a driving shaft, a driven shaft, a disk connected to one of said shafts and having in one face a series of pockets of the same pitch, and arranged in concentric rows, a pinion connected to the other of said shafts and adapted to engage the pockets in said disk, and means actuated by one of said shafts for shifting the pinion transversely of the disk and into engagement with any desired row of pockets in said disk, to vary the speed of the driven shaft, without disconnecting said disk and pinion or any of the power devices connected with either of them.

5. In a variable speed gearing, the combination of a driving shaft, a driven shaft, a disk connected to one of said shafts and having in one face a series of pockets arranged in concentric rows, a pinion connected to the other of said shafts to move longitudinally thereof and rotate therewith, said pinion engaging the pockets in the disk, and means actuated by one of said shafts for adjusting the pinion longitudinally of the shaft with which it is connected to cause it to engage any desired row of pockets in the disk without disconnecting either said disk and pinion or disengaging any of the power devices.

6. In a variable speed gearing, the combination of a gear having a plurality of series of pockets arranged in concentric rows and supplemental pockets arranged in spiral rows that intersect and connect said concentric rows, a pinion meshing with said gear, power devices for connecting said gear and pinion with a motor and an element to be driven, and means for shifting the pinion into engagement with the pockets of either concentric row of pockets on the gear, said spiral rows of pockets permitting such adjustment and giving an appreciable length of time therefor while the pinion and gear are in engagement and the motor and connecting devices in operation.

7. In a variable speed gearing the combination of a rotatable disk having a plurality of series of pockets arranged in concentric rows and also a series of pockets arranged in spiral rows and leading from the center of the disk to the outermost circular row of pockets, said spiral rows connecting the several circular rows, a pinion meshing with said disk, power devices for connecting said disk and pinion with a motor and an element to be driven, means for moving the pinion into engagement with said spiral rows of pockets in the disk to shift it to and from the center of the disk while engaged therewith, and means for holding the pinion stationary at the center of the disk.

8. In a variable speed gearing, the combination of a rotatable disk having on one face a central pocket, a series of pockets arranged in concentric rows about said central pocket, and additional pockets arranged in spiral rows connecting said central pocket and concentric rows, a pinion meshing with the pockets in said disk, power devices for connecting said disk and pinion with a motor, and an element to be driven, and means for causing the pinion to engage the spiral rows of pockets in the disk and move to or from the center of the disk, a tooth on the pinion engaging the central pocket of the disk when in alinement therewith and holding the pinion relatively stationary.

9. In a variable speed gearing, the combination of a rotatable disk having on one face a central pocket, a series of pockets arranged in concentric rows about said central pocket, and a series of pockets arranged in spiral rows and connecting said central pocket with the aforesaid circular rows, a pinion engaging the pockets in the disk, power devices for connecting the disk and pinion with a motor and with an element to be driven, and means for shifting the pinion transversely of the disk into engagement with either circular row of pockets therein or with the central pocket, said spiral rows of pockets permitting such adjustment on opposite sides of the center of the disk whereby the direction of rotation of the driven part may be reversed.

10. In a variable speed gearing, the combination of a rotatable disk having in one face a series of pockets arranged in concentric rows, a pinion engaging said pockets in the disk, power devices for connecting said disk and pinion with a motor and an element to be driven, means for shifting the pinion transversely of the disk into engagement with either of said concentric rows of pockets, and means for automatically varying the speed of said pinion during its passage from one of said rows to another to prevent jar or shock as it engages either row of pockets on the disk.

11. In a variable speed gearing, the combination of a gear having on one face a series of pockets arranged in concentric rows, the pockets in each row starting from a common line lying in a plane including the axis of the disk and forming a segment of parallel rows adjacent said line, and having additional pockets arranged in spiral rows extending across said segment and connecting the aforesaid circular rows, a pinion engaging the pockets in said disk, power devices for connecting the disk and pinion with a motor and with an element to be driven, and means for shifting the pinion into engagement with said spiral rows of pockets in the disk to adjust it from one circular row thereon to another as it passes across said segment.

12. In a variable speed gearing, the combination of a rotatable disk, having in one face a series of pockets arranged in concentric rows, and having a plurality of parallel grooves connecting alined pockets in adjacent rows and forming a segment of parallel grooves extending from the center of the disk to the outer row of pockets therein, a pinion having teeth adapted to enter said pockets in the disk, and means for shifting said pinion to and from the center of the disk when the teeth thereon are in engagement with pockets connected by the aforesaid parallel grooves.

13. In a variable speed gearing, the combination of a rotatable disk having on one face a series of pockets arranged in rows concentric with a central pocket, a groove or channel connecting said central pocket with alined pockets in each of the concentric rows, and a plurality of shorter grooves or channels extending parallel to the one aforesaid and connecting alined pockets in the several rows and forming a segment of parallel grooves, a pinion having teeth adapted to enter said pockets in the disk, and means for shifting said pinion toward and from the center of the disk when in engagement with pockets connected by said parallel grooves.

14. In a variable speed gearing, the combination of a rotatable disk, having on one face a series of pockets arranged in concentric rows, a pinion adapted to engage said pockets on the disk, and means for causing said pinion to automatically move transversely of the disk and into successive engagement with the different rows of pockets without disconnecting said pinion and disk, or any of the power devices connected therewith.

15. In a variable speed gearing, the combination of a rotatable disk having on one face a series of pockets arranged in concentric rows, a pinion adapted to engage said pockets, and means for automatically shifting the pinion transversely of the disk at each revolution thereof, whereby the pinion may be caused to successively engage each row of pockets on the disk.

16. In a variable speed gearing, the combination of a rotatable disk, having on one face a series of pockets arranged in concentric rows, a pinion adapted to engage said pockets on the disk, means for adjusting the pinion transversely of the disk, to cause it to engage either of the rows of pockets thereon, a rack bar connected to the pinion to move laterally therewith, and a cam geared to the disk and engaging said rack to prevent lateral movement of the pinion except when the disk is in a particular relation to the pinion.

17. In a variable speed gearing, the combination of a disk having on one face a series of pockets arranged in concentric rows, a pinion adapted to mesh with the pockets on said disk, means for shifting the pinion transversely of the disk into engagement with either row of pockets, a rack bar connected to the pinion to move transversely of the disk therewith, and a cam geared to the disk and engaging said rack, said cam having a gap or notch formed therein and alining periodically with the engaging tooth of the rack to permit the pinion to be intermitently adjusted transversely of the disk.

18. In a variable speed gearing, the combination of a disk having on one face a series of pockets arranged in concentric rows, a pinion adapted to mesh with the pockets on said disk, means for shifting the pinion transversely of the disk into engagement with either row of pockets, a rack bar connected to the pinion to move transversely of the disk therewith, and a cam geared to the disk and engaging said rack, said cam having a gap or notch formed therein and alining periodically with the engaged tooth of the rack to permit the pinion to be intermittently adjusted transversely of the disk, said rack having a return bend adapted to engage the cam when the pinion passes the center of the disk and the traversing segment of the disk is on the opposite side of said center.

19. In a variable speed gearing, the combination of a disk having on one face a series of pockets arranged in concentric rows, a pinion adapted to mesh with said pockets on the disk, means for shifting the pinion transversely of the disk, including a rack or toothed bar, a cam geared to the disk, and engaging said rack or toothed bar, said cam having a peripheral gap or notch formed therein and permitting lateral movement of the rack and pinion when in alinement with the rack, and a dog or pawl pivotally connected to the cam, and extending into the peripheral gap therein, into the path of the rack.

20. In a variable speed gearing, the combination of a rotatable disk, having on one face a series of engaging features arranged in concentric rows, a pinion adapted to engage said engaging features on the disk, and means for causing said pinion to automatically move transversely of the disk and into successive engagement with the different rows of engaging features without disconnecting said pinion and disk, or any of the power devices connected therewith.

21. In a variable speed gearing, the combination of a rotatable disk having on one face a series of engaging features arranged in concentric rows, a pinion adapted to engage said engaging features, and means for automatically shifting the pinion transversely of the disk at each revolution thereof, whereby the pinion may be caused to successively engage each row of engaging features on the disk.

22. The combination of a wheel having a plurality of circular lines of concentric engaging features, a gear adapted to mesh with said engaging features and movable diametrically across the said wheel, and means for moving the gear, said means being actuated by the movement of the wheel.

23. The combination of a wheel, having a plurality of concentric rows of engaging features thereon, said engaging features including a radial feature, a gear meshed with said engaging features, and means for moving the gear radially along the wheel.

24. The combination of a face gear having multiple rows of engaging features, a gear meshed therewith, a slide having connection with the gear, to move the gear across the face of the first named gear, and means for actuating the slide, said means being actuated by the movement of the first named gear.

25. The combination of a multiple gear, a second gear coacting therewith and movable across the face thereof, a slide in connection with the second gear, and means actuated from the first named gear for moving the slide in either direction.

26. The combination of a multiple gear, a gear in mesh therewith and movable across the face thereof, and means for shifting the second named gear in either direction, said means being operated from the first named gear.

27. In a variable speed gearing, the combination of a rotatable disk having in one face a plurality of series of engaging features arranged in concentric rows and means connecting all of said concentric rows on the same radii, whereby a pinion continuously engaging said disk may be moved from one of said rows to another, a pinion engaging said engaging features in the disk, power devices for connecting said disk and pinion with a motor and with an element to be driven, and means for adjusting said pinion from one of said concentric rows of engaging features in the disk to another to vary the speed of the driven element.

28. In a variable speed gearing, the combination of a driving shaft, a driven shaft, a disk connected to one of said shafts and having in one face a series of engaging features of the same pitch and arranged in concentric rows, a pinion connected to the other of said shafts and adapted to engage the engaging features in said disk, and means actuated by one of said shafts for shifting the pinion transversely of the disk and into engagement with any desired row of engaging features in said disk, to vary the speed of the driven shaft, without disconnecting said disk and pinion or any of the power devices connected with either of them.

29. In a variable speed gearing, the combination of a driving shaft, a driven shaft, a disk connected to one of said shafts and having in one face a series of engaging features arranged in concentric rows, a pinion connected to the other of said shafts to move longitudinally thereof and rotate therewith, said pinion engaging the engaging features in the disk, and means actuated by one of said shafts for adjusting the pinion longitudinally of the shaft with which it is connected to cause it to engage any desired row of engaging features on the disk without disconnecting either said disk and pinion or disengaging any of the power devices.

In testimony whereof I affix my signature in presence of two witnesses.

EDWARD P. COWLES.

Witnesses:
S. B. CRAIG,
A. C. BURNETT.